United States Patent [19]
Davis

[11] Patent Number: 5,249,783
[45] Date of Patent: Oct. 5, 1993

[54] VIBRATION ABSORBING DAMPER

[75] Inventor: Lawrence P. Davis, Phoenix, Ariz.

[73] Assignee: Honeywell Inc., Minneapolis, Minn.

[21] Appl. No.: 648,500

[22] Filed: Jan. 30, 1991

[51] Int. Cl.$^5$ .............................................. F16F 9/10
[52] U.S. Cl. .................................. 267/217; 188/298;
  188/311; 188/314; 188/322.12; 188/322.19;
  267/122; 267/140.13
[58] Field of Search .................... 267/64.13, 118, 113,
  267/122, 140.1 R, 140.1 A, 217, 64.23; 188/314,
  322.11, 322.12, 322.19, 297, 298, 311

[56] References Cited

U.S. PATENT DOCUMENTS

| | | | |
|---|---|---|---|
| 2,756,952 | 7/1956 | Gazley | 248/638 X |
| 3,618,928 | 11/1971 | Taylor | 267/64.13 X |
| 4,921,224 | 5/1990 | Fukumura et al. | 267/122 X |

FOREIGN PATENT DOCUMENTS

| | | | |
|---|---|---|---|
| 2500555 | 8/1982 | France | 267/140.1 A |
| 66539 | 6/1981 | Japan | 267/140.1 |
| 1421959 | 9/1988 | U.S.S.R. | 188/298 |

Primary Examiner—George E. A. Halvosa
Attorney, Agent, or Firm—Arnold L. Albin

[57] ABSTRACT

A vibration absorbing damper of the viscous type having an outer cylinder enclosing a damping member with the damping member positioned for axial movement within the outer cylinder while retaining a hermetic seal without the use of gaskets or seals. The damping member is comprised of a pair of arcuate structures with high volumetric rigidity and joined axially by a nonelastomeric member. A fluid-retaining reservoir is deformed by forces applied to the exterior cylinder, resulting in deformation of the arcuate structure and resulting compression or extension of the fluid reservoir. Excess fluid is forced into a bellows through a restricting orifice for storage during compression stresses, and returned from the bellows to the fluid reservoir during extension of the outer cylinder during cyclical vibration. The damper operates with deflections as small as 1 microinch and provides a large actuating force, even though the motion is very small. By virtue of the hermetically-sealed structure and freedom from gaskets and seals in the operating mechanism, the damper is particularly suited for space satellite applications and high performance, lightweight truss structures.

8 Claims, 4 Drawing Sheets

VIBRATION ABSORBING DAMPER

BACKGROUND OF THE INVENTION

1. Field of the Invention

The present invention relates to an apparatus for vibration damping, and more particularly with respect to a viscous damper for space satellite applications.

2. Description of the Prior Art

A body moving in an oscillatory manner is said to be in vibration. Vibration is undesired in some systems because it may generate disturbing noise, cause errors in instrumentation mounted on the system, or, indeed, lead to physical destruction of the system if of sufficient amplitude. Thus, it is desirable to minimize the adverse effects of undesired vibrations. Vibration can be controlled by dissipating the vibratory energy. The resistance force that causes the vibration amplitude to decrease with time is called damping, and may be frictional or coulomb damping, which results when there is a sliding motion between two surfaces in contact, or viscous damping, where the magnitude of the damping force is directly proportional to the relative velocity between the two ends of a damping device. Viscous damping is desirable because it lends itself to linear, analytically predictive relationships, and the absence of coulomb-type friction assures no problems from wearout. Viscous damping may be represented by the sliding motion between lubricated surfaces or a component, such as a dashpot that is immersed in oil. Equations for the solution of damping parameters for viscous dampers are well known in the art. See, for example, C. M. Haberman, *Vibration Analysis*, Charles E. Merrill Pubs. Co., 1968.

Conventional vibration absorption devices consist typically of hydraulically damped springs or resilient elements interposed between a supporting structure and the equipment to be isolated from vibration. Damped springs in various forms and elastomeric pads are generally satisfactory for protecting equipment that is not sensitive to alignment. However, hydraulic devices generally require oil seals in the nature of resilient gaskets, which are subject to wear and leakage after extended use, while elastomeric or viscoelastic dampers may not retain structural alignment. Further, these devices may also introduce coulomb-type friction and are not generally useful for microinch displacements, and may have a damping coefficient which varies with displacement.

The present vibration absorption damper provides superior damping for displacements of the order of microinches. A hermetically sealed structure requires no sealing gaskets or other components subject to wear in operation. During vibration the damper yields axially and allows controlled damping of the structure to be isolated. Damping is independent of vibration amplitude or frequency over a wide range and relatively independent of temperature.

A disadvantage of prior art viscoelastic damping devices is that the damping coefficient may vary with the stiffness of the structure. Thus, distortion of the structure with an applied force results in a nonlinear damping response. The present invention provides a damping force which is directly proportional to velocity and independent of stiffness or displacement. An arch configuration provides substantial volumetric rigidity; that is, the structural deflection of the damping elements is directly proportional to the applied force. Relative to prior art dampers the present invention provides very large damping capability per unit weight or volume. In the form of a tubular assembly, the invention is particularly adapted to use as a damping support for structures or as one of a plurality of elements in a truss structure.

SUMMARY OF THE INVENTION

A vibration absorption damper in accordance with the present invention employs a pair of coaxial cylindrical members which are affixed to opposing elements of a damping member at one end of the cylindrical members and rigidly interconnected at the second end of the cylindrical members. A fluid chamber defined by the damping elements communicates with a resilient reservoir through a tubular member providing a restrictive orifice, which reservoir expands and contracts as fluid from the fluid chamber is forced into or extracted from the reservoir during corresponding compression and extension of the exterior cylinder. The arcuate shape of the fluid chamber provides substantial volumetric rigidity during activation of the damper while allowing the inner cylindrical member to compress or extend the fluid chamber in response to the external forces. Upon compression of the exterior cylinder, fluid is forced from the arcuate chamber into the reservoir; on relaxation or extension of the exterior cylinder, the spring constant of the reservoir forces the return of fluid into the fluid chamber. The system is hermetically sealed and comprises no gaskets or frictional moving parts; hence, it is particularly adaptable to a space environment, where long life and freedom from radiation effects is required. Because of the lack of friction and ability to function at microinch displacements, the damper is uniquely effective in providing a high degree of damping when incorporated in a truss-type structure.

In a preferred embodiment, a vibration absorbing damper comprises an outer cylindrical housing and an inner cylindrical member disposed coaxially within the outer cylindrical housing and having a first end proximal to a first end of the outer housing and a second end proximal to a second end of the outer housing. The outer cylindrical housing and the inner cylindrical member are rigidly coupled at their first and second ends. A damping member is comprised of an outer damping element affixed to the first end of the outer housing and an inner damping element affixed to the second end of the inner cylindrical member, wherein the inner and outer elements are spaced to provide a deformable fluid chamber therebetween. The fluid chamber further comprises first and second arcuate facing surfaces in which the outer element has a further arcuate surface substantially concentric with the first arcuate facing surface, and the inner member has a still further arcuate surface which is substantially concentric with the second arcuate facing surface and with the surfaces of the outer member.

The resilient auxiliary fluid reservoir is disposed within the inner cylindrical member and spaced away from the inner element of the fluid chamber. A tubular member further provides a fluid flow-restricting path communicating with the auxiliary fluid reservoir and with the main fluid chamber.

The fluid chamber further comprises an annular hollow structure which forms an arcuate fluid chamber, the annular hollow structure being so constructed and adapted by virtue of its coupling the inner and outer elements of the damping member as to be axially deformable and substantially volumetrically rigid and providing means for communicating with the fluid reservoir. The fluid chamber, tubular member, and auxiliary fluid reservoir are filled with a suitable fluid.

DESCRIPTION OF THE PREFERRED EMBODIMENT

Figure 1:
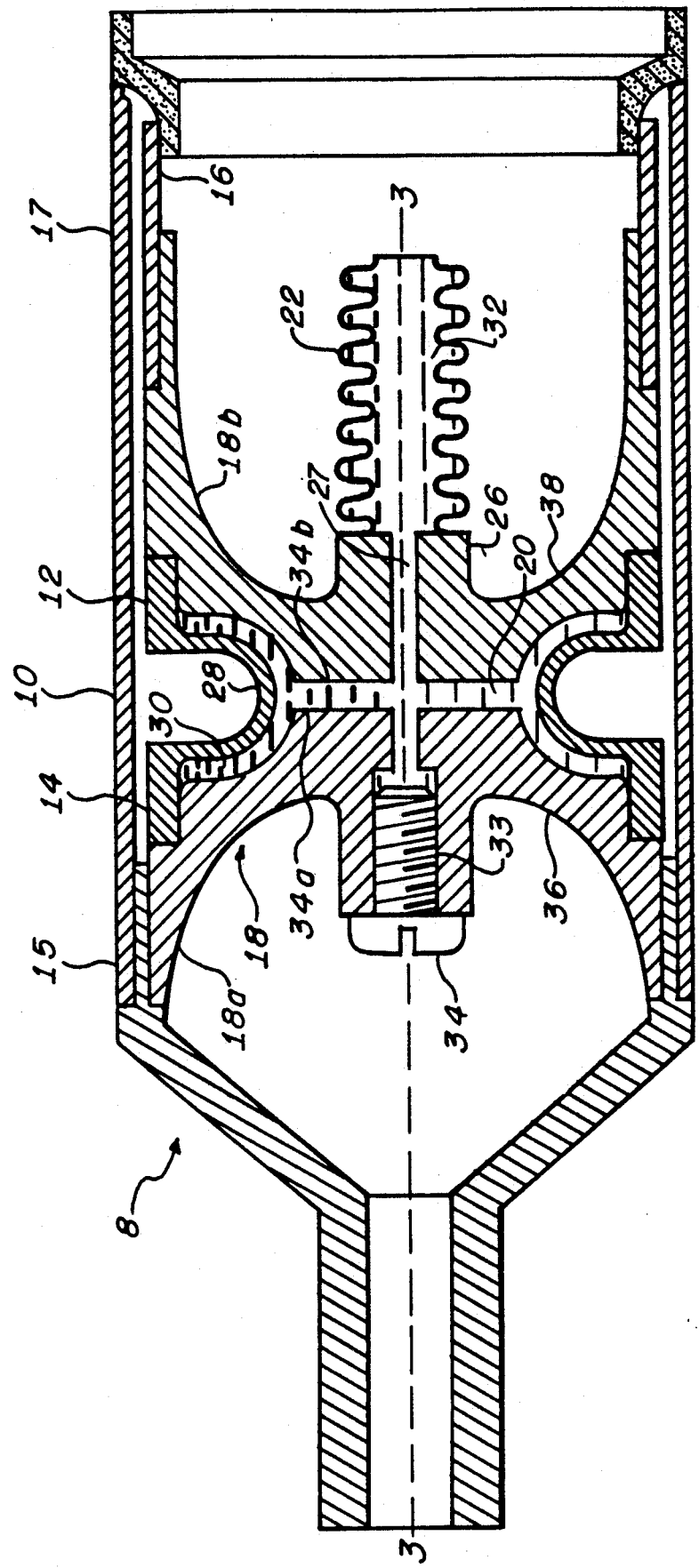
FIG. 1 is a cross-section view of an embodiment of the present vibration absorption damper invention.

The invention will now be described with reference to the Figures, which are illustrative, and not to scale. The construction of vibration absorption damper 8 will be described with reference to FIG. 1. Vibration damper 8 is preferably of the tubular type and includes an outer cylindrical housing 10 in which an inner cylindrical member 12 is located coaxially. Inner member 12 has a first end 14 which is affixed to a damping element 18A to be described and a second end 16 which is rigidly affixed to a second end 17 of the outer housing. Thus, any extension or contraction of outer cylindrical housing 10 due to an applied vibratory force is communicated to the inner cylindrical member 12 and to the damping element 18B.

A damping member 18 is comprised of a proximal element 18A which is also affixed to the first end 15 of outer housing 10 and distal element 18B which is affixed to the second end 16 of the inner cylindrical member 12. Proximal element 18A and distal element 18B are spaced to provide a recess which forms a fluid chamber 20 whose function is to be described. In the embodiment of FIG. 1, proximal element 18A is provided with a planar surface 34A facing planar surface 34B of distal element 18B, thus forming a portion of chamber 20. Proximal element 18A is further provided with an arcuate surface 36 which lends radial and volumetric stability and rigidity to the structure while minimizing weight. Similarly, element 18B also has an arcuate surface 38.

A bellows or other resilient hollow member is utilized to provide an auxiliary fluid reservoir 22 which is preferably axially disposed within the inner cylindrical member 12, although this is not to be considered limiting, and communicates with the fluid chamber 20 by means of a tubular member 26 defining a fluid flow-restricting orifice 27.

The invention further comprises an annular hollow structure 28 which resiliently couples damping elements 18A and 18B and thereby further defines an arcuate portion 30 of fluid chamber 20. Annular structure 28 is so constructed as to be axially deformable and substantially volumetrically rigid, this being an inherent structural feature of an arch flexure. A suitable fluid 32 is applied through orifice 33 to fill the fluid chambers after evacuating the system, which is then sealed by a plug 34.

Figure 2:
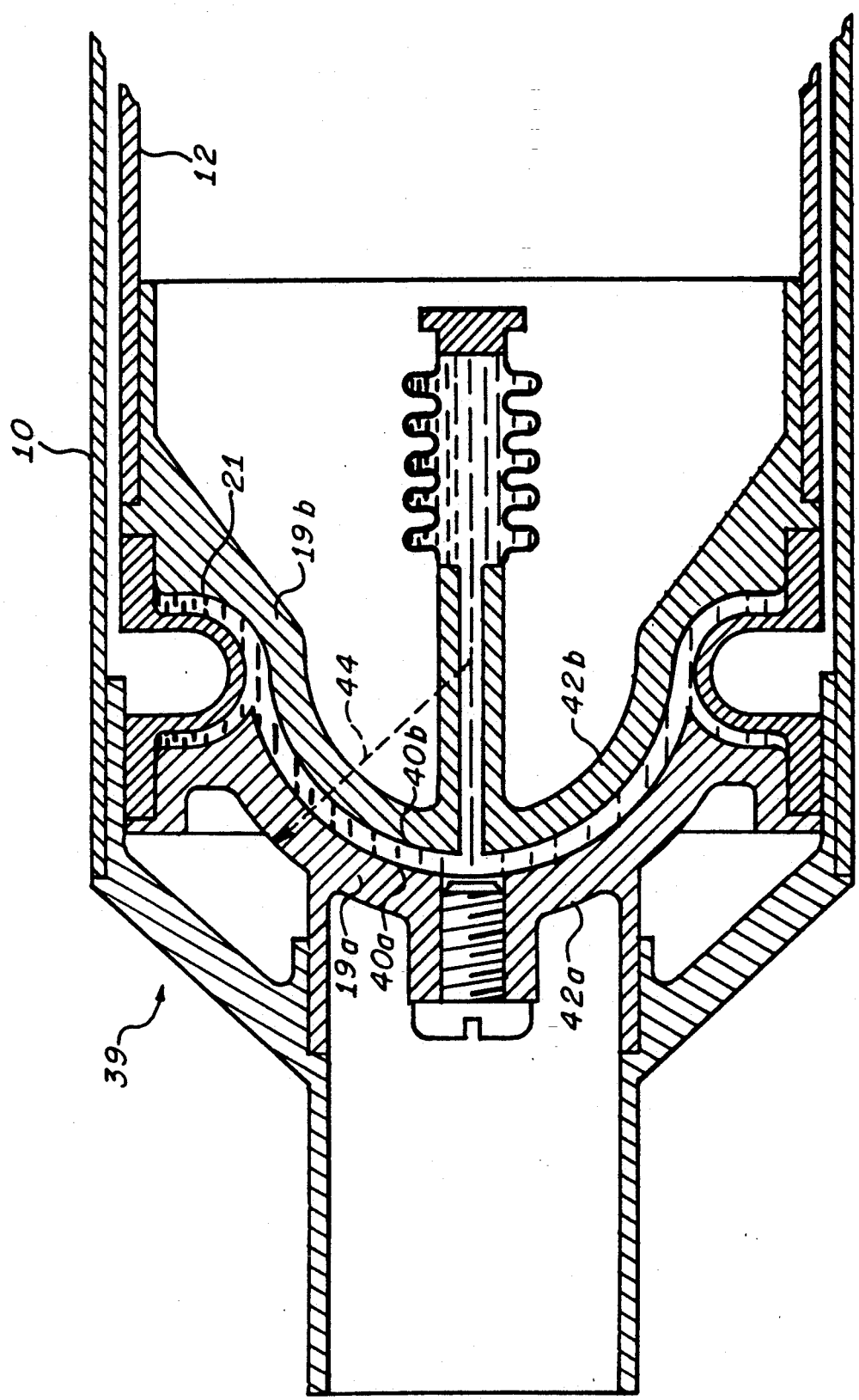
FIG. 2 is a cross-section view of a further embodiment of the present invention.

A further preferred embodiment is shown in FIG. 2. In this embodiment, the main fluid chamber 21 is further comprised of a proximal damping element 19A having an outer arcuate surface 42A and an inner arcuate surface 40A, these surfaces being substantially concentric. In a similar manner, distal damping element 19B is comprised of an arcuate surface 40B facing surface 40A of damping element 19A and a concentric arcuate surface 42B. The vibration absorption damper 39 of FIG. 2 affords increased rigidity per unit of weight and thereby may provide improved performance at a given weight or minimize weight as compared to the embodiment of FIG. 1, which, however, is simpler to fabricate.

Figure 3:
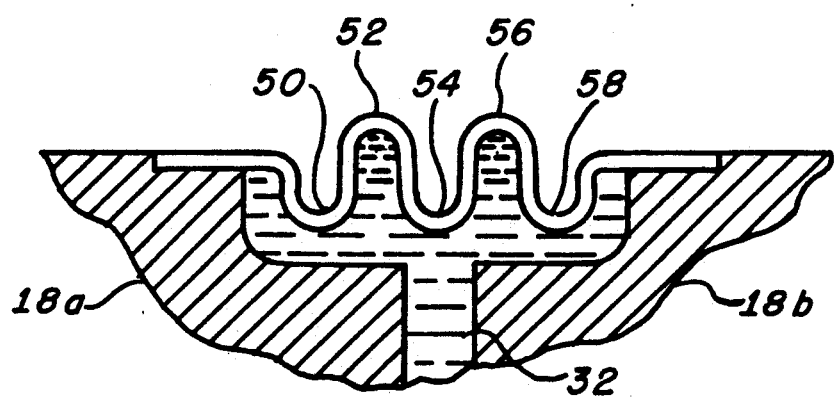
FIG. 3 is a cross-section view showing a detail of a still further embodiment of the invention.

FIG. 3 shows a detail of a further embodiment of the arch structure of FIG. 2, in which a plurality of contiguous arch members 50, 52, 54, 56 and 58 are provided, thereby providing a plurality of interconnected fluid passages. This structure affords increased stroke capability in proportion to the number of arch members, while preserving volumetric rigidity. Thus, an external force applied to the damper causes a proportional compression or extension of each of the fluid passages, so that the absorbing damper is operative over a deflection range proportional to the number of the arcuate fluid passages.

Figure 6:
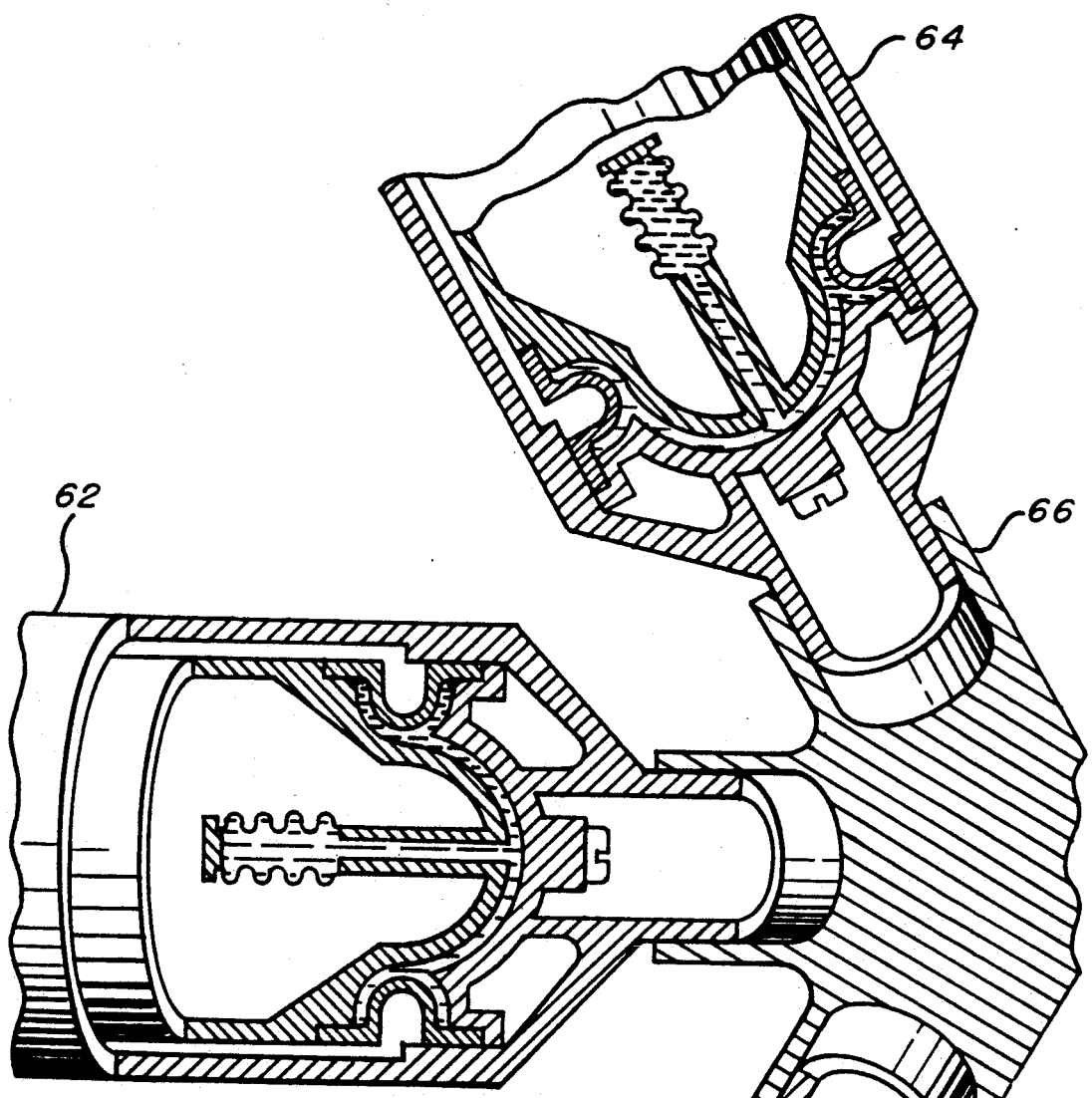
FIG. 6 is a cross-section view of a truss employing the damper of the present invention as a structural element.

Referring now to FIG. 6, a damper constructed in accordance with the present invention may be utilized as a structural element in a truss type structure. Thus, for example, dampers 60, 62, and 64 may be joined at member 66 in a triangular array to provided static rigidity while affording a high degree of dynamic damping.

Since the embodiments of the invention heretofore described operate in a similar manner, the operation of the invention will be described in detail with reference to FIG. 1. To provide high stiffness, low weight and structural stability, the vibration absorbing damper must resist deflections with a force directly proportional to velocity. The present invention functions by employing a fluid system that resists axial deflections by shearing fluid and creating an opposing force proportional to velocity. This energy-absorbing force dissipates vibratory energy as heat in the fluid and settles the vibration. This is accomplished using a very small quantity of incompressible fluid and by shearing this fluid through an orifice as a result of the deflection. The applied force needs to be large, even though the motion is very small and may be of the order of microinches. The resulting forces should not encounter coulomb-type friction, or structural hystreses may result. Although the fluid is hermetically sealed within a metal enclosure, the flexing of the metal to allow motion is within the elastic limit, thus avoiding either sticktion, permanent structural distortion, or fracture. When outer cylinder 10 is stressed, it causes a load along the longitudinal axis X—X of vibration absorption damper 8. This load will cause a corresponding stretching or contraction of the inner and outer elements of the damper. If, for example, outer cylinder 10 is compressed, elements 18A and 18B, which are affixed to the ends 15 and 17 of outer cylinder 10, are correspondingly compressed. Since arcuate structure 28 is axially deformable, elements 18A and 18B will be forced in closer proximity. The resulting constriction of chambers 20 and 30 force fluid through tubular member 26 into auxiliary fluid reservoir 22, which is caused to expand in bellows fashion. The forcing of fluid through the aperture and motion imparted to reservoir 22 result in the dissipation of vibratory energy in the form of heat.

When, in the normal oscillatory vibration, the deflection reverses, the fluid 32 is then forced by the spring action of reservoir 22 in the opposite direction, again through the restricting annulus of tubular member 26 and distal element 18B, into chamber 20 and chamber 30. Chamber 30 expands by virtue of the elasticity of arcuate member 28, which is stretched axially by the extension of cylinder 10. Any fluid of suitable viscosity and temperature characteristics may be chosen for use with the present invention. Typically, the restrictive orifice will be of the order of 0.0040 diameter. Fluid means 32 must be kept under pressure, and this can be accomplished by the spring properties of the reservoir or by use of an auxiliary preload spring (not shown) to establish the desired damping characteristics.

Figure 4:
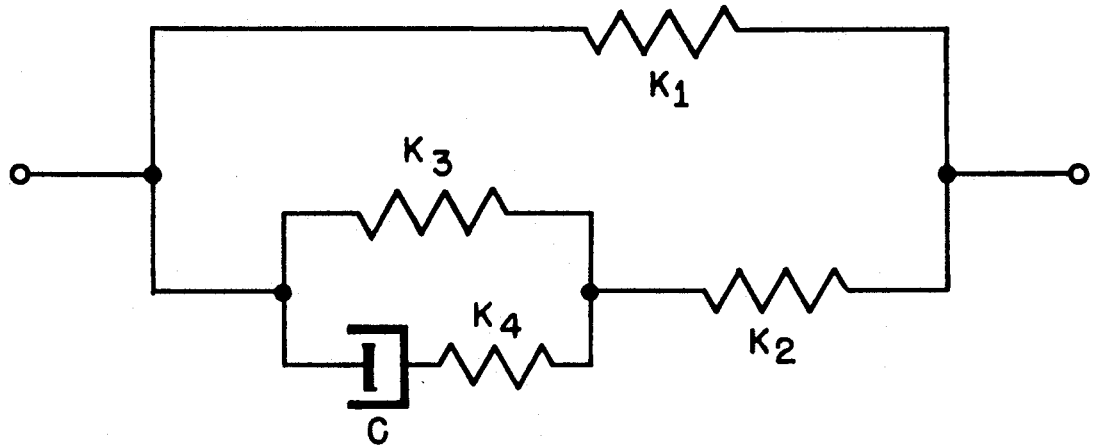
FIGS. 4 and 5 are schematic drawings useful for understanding the operation of the invention.
Figure 5:
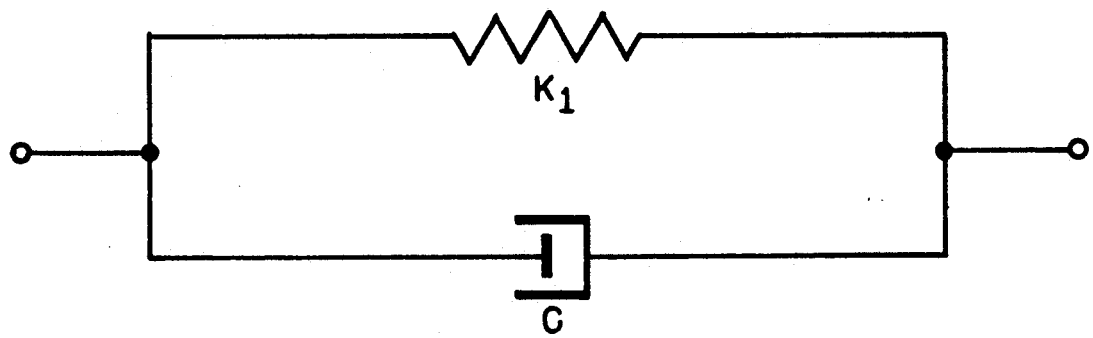

Referring now to FIGS. 4 and 5, the parameters of the invention necessary to maximize performance may be more readily understood. FIG. 4 is a schematic model of the absorption damper in which $K_1$ represents the desired stiffness of the outer tube 10, $K_2$ represents the stiffness of the inner tube 12, $K_3$ is the axial stiffness of the annular hollow structure 28, $K_4$ represents the compressibility of the fluid 32 in series with the volumetric stiffness of the annular structure 28, and C is the damping coefficient resulting from the shearing of fluid 32 through tubular member 26.

In order to optimize performance, it is desired that $K_2$ and $K_4$ be very stiff, while $K_3$ be very resilient and that the ratio $K_4/K_3$ be maximized, while the ratio $K_3/K_2$ be minimized. Thus, ideally, $K_4$ equals $\alpha$, $K_3$ equals 0, $K_2$ equals $\alpha$, and $K_1$ equals a predetermined value consistent with the overall structural design. In practice, values of $K_3$ of the order of 10,000 lbs/in or less and values of $K_4$ of the order of 500,000 lbs/in have been realized. $K_1$ and $K_2$ may be of the order of 100,000 lbs/in.

It is clear from the above that to maximize performance, the volumetric stiffness of annular structure 28 must be very high, which, of course, is an inherent characteristic of an arch flexure structure. Further, the axial stiffness of the annular structure should be as low as possible, e.g., compliant in bending. If the above conditions are satisfied, then the circuit of FIG. 4 simplifies to that shown in FIG. 5. This may be recognized as a classical second-order vibration damping system. By proper selection of the materials of cylinders 10 and 12, fluid, fluid flow-restricting paths, and annular hollow structure 28 configuration and size, performance can be obtained which exceeds the current state of the art. Typically, the present invention will provide damping values in the range of 10 percent to 50 percent with excursions up to 0.040 in, as compared to prior art values of 1 percent to 10 percent for micro-inch displacements.

It may be seen that the present invention provides the following advantages:

1. High values of damping.
2. Damping is independent of stiffness.
3. Damping is substantially independent of temperature.
4. Damping is independent of vibration amplitude.
5. Damping is linearly proportional to velocity.
6. There is no sticktion or coulomb-type friction that might jeopardize structural integrity or complicate analytical predictions.
7. The absence of wearout mechanisms leads to virtually unlimited life.

While the invention has been described in its preferred embodiments, it is to be understood that the words which have been used are words of description rather than limitation and that changes may be made within the purview of the appended claims without departing from the true scope and spirit of the invention in its broader aspects.

Embodiments of an invention in which an exclusive property or right is claimed are defined as follows:

1. A vibration absorbing damper, comprising:
    an outer cylindrical housing comprised of a substantially rigid material of uniform radius and having a predetermined axial stiffness,
    damping member means disposed within said outer cylindrical housing, for dissipating vibratory and shock forces applied to said damper,
    an inner cylindrical member disposed coaxially within said outer cylindrical housing and having a first end proximal to a first end of said outer housing and a second end proximal to said damping member means,
    said outer cylindrical housing and said inner cylindrical member being fixedly coupled at the respective first ends thereof, said damping member means flexibly coupled to a second end of said inner cylindrical member and fixedly coupled to said second end of said outer cylindrical housing, whereat axial deflection of said outer cylindrical housing is linearly coupled to a corresponding axial deflection of said damping member means,
    said damping member means further comprising a proximal element affixed to said second end of said outer cylindrical housing and a distal element affixed to said second end of said inner cylindrical member, said proximal and distal elements defining a deformable recess comprising fluid chamber means,
    said damping member means further comprising first and second facing planar surfaces forming a first portion of said fluid chamber means, said proximal element defining an arcuate surface opposing said first planar surface and said distal element defining an arcuate surface opposing said second planar surface, whereat said proximal and distal elements are so constructed and adapted as to be substantially volumetrically rigid, and further defining an annular arcuate fluid passage communicating with said first portion of said fluid chamber means,
    said fluid chamber means further comprising an annular arcuate nonelastomeric structure conforming to said annular arcuate fluid passage means for resiliently coupling said proximal and distal elements of said damping chamber means and for enclosing said annular fluid passage therebetween, said structure being axially deformable and substantially radially rigid,
    a resilient auxiliary fluid reservoir disposed within said inner cylindrical member and proximal to an arcuate surface of one of said elements of said fluid chamber means, for storing and replenishing fluid to said fluid chamber means,
    a tubular member interposed between said arcuate surface of said one of said elements of said damping member means and said auxiliary fluid reservoir, defining a central fluid flow-restricting orifice and communicating with said auxiliary fluid reservoir and said fluid chamber means, and fluid means enclosed within said fluid chamber means, said tubular member, and said auxiliary fluid reservoir for axially deforming said fluid chamber means and dissipating vibratory forces and shock forces applied to said damper by frictional passage through said orifice.

2. A vibration absorbing damper as set forth in claim 1, wherein said outer cylindrical housing, said damping member, and said inner cylindrical member are comprised of metal joined into an integral enclosure, thereby to comprise an hermetically sealed enclosure free from an elastomeric seal.

3. A vibration absorbing damper as set forth in claim 2, wherein said proximal element of said damping member means further comprises orifice means communicating with said fluid chamber means for filling said fluid chamber means with a fluid.

4. A vibration absorbing damper as set forth in claim 3, wherein said tubular member and said auxilliary fluid reservoir means are axially disposed within said inner cylindrical member.

5. A vibration absorbing damper as set forth in claim 1, wherein said annular arcuate structure of said fluid chamber means further comprises a plurality of arcuate fluid passages contiguously connecting said proximal and said distal elements of said damping chamber means, and so adapted and constructed that an external force applied to said damper causes a proportional compression or extension of each of said plurality of arcuate fluid passages, whereby said absorbing damper is operative over a deflection range proportional to the number of said plurality of arcuate fluid passages.

6. A vibration absorbing damper as set forth in claim 1, wherein said outer cylindrical housing has a first predetermined coefficient of stiffness $K_1$, said inner cylindrical member has a second coefficient of stiffness $K_2$, said annular arcuate nonelastomeric structure has a third axial coefficient of stiffness $K_3$, $K_4$ is a factor representing the combination of volumetric compression of said fluid means in series with the volumetric stiffness of said annular arcuate nonelastomeric structure, and the ratio $K_4/K_3$ is maximized so as to approach a value of infinity, while the ratio $K_3/K_2$ is minimized so as to approach a value of zero.

7. A vibration absorbing damper as set forth in claim 6, wherein said ratio $K_4/K_3$ has a first predetermined ratio less than infinity and said ratio $K_3/K_2$ has a second predetermined ratio greater than zero.

8. A vibration absorbing damper, comprising:
an outer cylindrical housing comprised of a substantially rigid material of uniform radius and having a predetermined axial stiffness,
damping member means disposed within said outer cylindrical housing for dissipating vibratory and shock forces applied to said damper,
an inner cylindrical member disposed coaxially within said outer cylindrical housing and having a first end proximal to a first end of said outer housing and a second end proximal to said damping member means,
said outer cylindrical housing and said inner cylindrical member fixedly coupled at the respective first ends thereof, said damping member means flexibly coupled to a second end of said inner cylindrical member and fixedly coupled to a second end of said outer cylindrical housing, whereat axial deflection of said outer cylindrical housing is linearly coupled to a corresponding axial deflection of said damping member means,
said damping member means further comprising a proximal element affixed to said second end of said outer cylindrical housing and a distal element affixed to said second end of said inner cylindrical member, said proximal and distal elements defining a deformable recess comprising fluid chamber means,
wherein said damping member means further comprises first and second arcuate conforming facing surfaces defining a first portion of said fluid chamber means, said proximal element defining a further arcuate surface substantially concentric with said first arcuate facing surface and said distal element defining a still further arcuate surface substantially concentric with said second arcuate facing surface and with said surfaces of said proximal element, whereat said proximal and distal elements are so constructed and adapted as to be substantially volumetrically rigid, and further defining an annular arcuate fluid passage communicating with said first portion of said fluid chamber means,
said fluid chamber means further comprising an annular arcuate nonelastomeric structure conforming to said annular arcuate fluid passage means for resiliently coupling said proximal and distal elements of said damping chamber means and for enclosing said annular fluid passage therebetween, said structure being axially deformable and substantially radially rigid,
a resilient auxiliary fluid reservoir disposed within said inner cylindrical member and proximal to an arcuate surface of one of said elements of said fluid chamber means, for storing and replenishing fluid to said fluid chamber means,
a tubular member interposed between said arcuate surface of said one of said elements of said fluid chamber means and said auxiliary fluid reservoir, defining a central fluid flow-restricting orifice and communicating with said auxiliary fluid reservoir and said fluid chamber means, and
fluid means enclosed within said fluid chamber means, said tubular member and said auxiliary fluid reservoir for axially deforming said fluid chamber and dissipating vibratory forces and shock forces applied to said damper by frictional passage through said orifice.

* * * * *